United States Patent Office 3,170,804
Patented Feb. 23, 1965

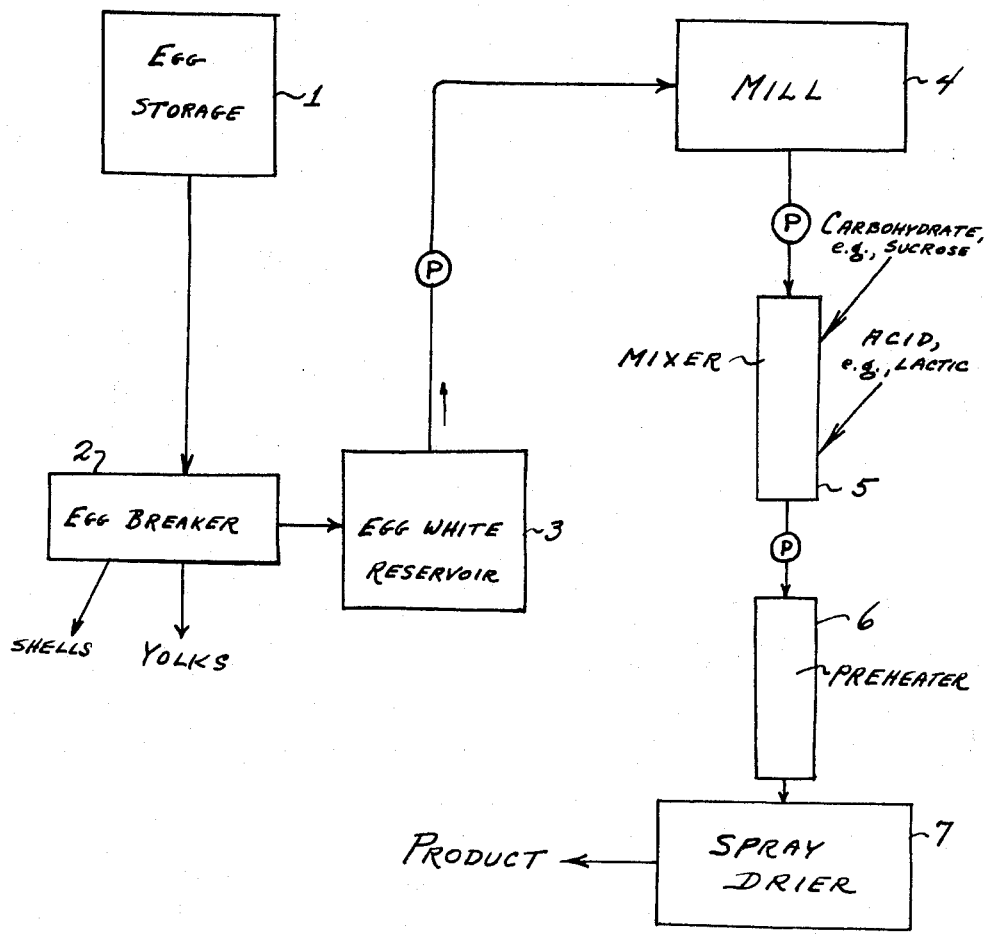

3,170,804
PREPARATION OF DRIED EGG WHITE
Leo Kline, El Cerrito, Takashi F. Sugihara, Richmond, and John J. Meehan, Pinole, Calif., assignors to the United States of America as represented by the Secretary of Agriculture
Filed June 3, 1963, Ser. No. 285,155
7 Claims. (Cl. 99—210)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing dried egg white products. Further objects and advantages of the invention will be evident from the following description wherein parts and percentages are by weight unless otherwise specified.

The single figure in the annexed drawing is a flow sheet illustrating continuous production of dried egg white in accordance with the invention.

It is well known in the art that egg white can be preserved by drying. It is also well known that if egg white is spray dried as such, the product is not satisfactory as it has very poor whipping properties and develops objectionable color, taste, and odor after even short periods of storage at ambient temperatures. It has been shown that the mechanism responsible for the poor storage stability of this product involves a reaction between the glucose and the proteins present therein, giving rise to compounds having a dark brown color and an unpleasant flavor. Also, this reaction, commonly referred to as non-enzymatic browning or the Maillard reaction, causes a denaturation or insolubilization of the egg proteins. To avoid such deteriorative action, in the commercial production of dried egg white it is conventional to subject the egg white, prior to drying, to a procedure which may be termed de-sugaring or de-glucosing, by which treatment the reducing sugars are removed. This is effected by subjecting the liquid egg white to the action of a bacteria, e.g., Lactobacilli, Streptococci, or Aerobacter; or a yeast such as ordinary bakers' yeast; or an enzyme, e.g., glucose oxidase, while keeping the temperature at about 85–95° F. and at pH's of about 6 to 7. Such biochemical elimination of glucose is relatively slow, requiring holding of the system for periods of 12 to 24 or more hours. It is evident that since the reducing sugars are removed, the Maillard reaction cannot take place any longer.

In commercial operations, egg white is never sterile but has a variable content of adventitious microbial flora. In some cases the egg material contains Salmonella organisms. The presence of these organisms is, of course, undesirable as they are pathogenic, producing the illness known as salmonellosis when ingested by humans in sufficient quantity. A common defect of the usual de-sugaring processes is that the conditions employed (e.g., long holding at temperatures conducive to bacterial growth, slightly acid to neutral pH, etc.) are suitable for the growth of adventitious organisms, including Salmonellae. Thus, when the usual de-sugaring operation is applied to egg white infected with Salmonellae it is observed that the population of these microorganisms increases to a large extent. Such an effect is highly undesirable as the presence of Salmonellae in the product may prohibit its use for human consumption.

In accordance with the invention, dried egg white is produced by a technique wherein the egg material is *not* subjected to de-sugaring; the natural sugar content of the egg material is retained intact. Thereby, several significant advantages are gained. A first point is that the outgrowth of adventitious microbial flora, including Salmonellae, is avoided. Thus, by eliminating the usual treatment of holding the warm egg white at lowered pH for long periods of time, the multiplication of adventitious microorganisms is prevented. Moreover, the process of the invention has the advantages of fast production and elimination of large inventories of egg white tied up in processing for anywhere from one to two days. Another factor is that the process of the invention lends itself to more sanitary practice by eliminating the prior practice of long holding of tanks of egg material which under the best of conditions are susceptible to contamination by insects, vermin, dust, etc. A further point is that the process of the invention provides an increased yield of dried egg product. This situation can be explained as follows. In conventional de-sugaring treatments, gas (mostly $CO_2$) is formed in the egg material and as this gas rises through the liquid it carries to the top the fibrous ovomucin material which settles on the top of the liquid as a scum. This scum, usually termed mucin, is removed prior to drying and discarded, representing a loss of egg material (protein) of about 3 to 7%. However, in the process of the invention there is no opportunity for this mucin to be separated from the remaining egg material and it is retained right through to the end product.

Basically, the process of the invention involves adding a carbohydrate and an edible acid to egg white which still contains its natural complement of sugars and drying the resulting composite material. Addition of the carbohydrate and acid takes the place of the usual de-glucosing step and provides a dried product which, in addition to the other advantages enumerated above, exhibits flavor and functional qualities far above those of spray-dried untreated egg white and indeed comparable to those displayed by spray-dried de-glucosed egg white. In particular, the products of the invention display excellent initial flavor and functional quality and maintain these qualities for long periods of storage at ambient temperatures.

Ordinarily in practicing the invention, sucrose is used as the carbohydrate. However, sucrose is by no means the only member of this group which can be employed and other examples of suitable carbohydrates are corn syrup or the solids derived therefrom, sorghum syrup or solids, malt syrup or solids, maltose, glucose, fructose, invert sugar, lactose, dextrins, and other water-soluble carbohydrates. Mixtures of different carbohydrates can, of course, be used and are included within the ambit of the invention. It is also evident that the carbohydrate may be added to egg white in various forms, e.g., as a solid, syrup, or solution. Usually it is preferred to incorporate the solid material to avoid adding water to the egg white. The amount of the carbohydrate may be varied. Usually one uses about 5 to 20%, preferably about 10%, based on the weight of the egg white and depending upon the storage conditions anticiptaed. It is obvious that one can employ more than 20% carbohydrate with effective results but such increased proportions will eventually alter the character of the product in that it will contain more carbohydrate than egg solids and hence have little commercial value. With the aforesaid range (5 to 20%) of carbohydrate, the dried product retains its identity as an egg white product and is eminently useful in all baking operations which call for egg white.

As noted hereinabove, in carrying out the process of the invention an acid is added to the egg white in conjunction with the carbohydrate. For this purpose, one can utilize any acid which is edible or at least non-toxic. Typical acids are, for example, hydrochloric, sulphuric, phosphoric, acetic, lactic, citric, etc. The amount of acid to be used is that quantity which provides a pH in the range of about 6 to 8 in the product on reconstitution.

It is to be noted that the invention contemplates the use of reducing sugars as the added carbohydrate. It may well be asked how can such sugars be effective to stabilize the product when conventional treatments involve the deliberate elimination of reducing sugars by fermentation or enzyme action. The point here is that the Maillard reaction requires a certain though small amount of water, such as is present in dehydrated products even though they are dry for all practical purposes. However, when the carbohydrate level is raised substantially above the natural level and the pH lowered by addition of acid, it is postulated that the water present in the product is bound or tied up in some chemical or physical way by the carbohydrate so that the Maillard reaction is hindered for lack of moisture. Thus, a deliberate increase in sugar concentration leads to increased stability instead of greater instability as might be expected.

It is acknowledged that among the many procedures disclosed in the prior art for preparing dried eggs, there are suggested processes wherein sugars are added prior to drying and other processes wherein the egg material is acidified before dehydration. Actually, neither addition of carbohydrate by itself nor acidification by itself provides a stable egg white product. For example, if a sugar such as sucrose is incorporated into egg white without acidification, the resulting dried product has virtually no foaming power and is unsuitable for such uses as preparing angle-food cakes, meringues, etc. In processes wherein egg white is acidified without addition of carbohydrate the foaming power of the product is good initially but as the product is stored, the foaming and binding power of the material rapidly diminish and dark colors and offensive odors are developed. By incorporation of both carbohydrate and acid, in accordance with the invention, there is produced a product which displays excellent flavor and functional properties, including foaming power, and these properties are retained even after long storage.

The preferred embodiment of the invention includes certain features in addition to the basic procedure discussed above. These features are explained below, having reference to the annexed drawing which illustrates a preferred method for applying the process of the invention in continuous operation. Shell eggs from storage area 1 are fed to conventional egg-breaking plant 2. The egg white so produced is stored in reservoir 3 which is preferably provided with a cooling jacket or other appropriate means to keep the egg white cool, that is, at about 40 to 50° F. It is preferred to maintain the egg white at 50° F. or below since Salmonellae will not multiply in egg liquids at such temperature levels.

In further processing of the egg white, starting from the time it is withdrawn from reservoir 3 until the final product is produced, it is preferred that all operations be continuous and carried out without any delay so that there is no opportunity for microbial growth in the egg. As a further safeguard, cooling means may be employed so that the egg white, up until the point when it is introduced into the drying system, is continuously maintained at a cool temperature and preferably at 50° F. or below to avoid all possibility of growth of Salmonella organisms.

Egg white from reservoir 3 is pumped to mill 4 wherein it is milled as by the action of rotating blades to shred the network of ovomucin fibers in the egg material and incorporate them uniformly throughout the liquid mass. Mill 4 may be provided with conventional cooling means, such as a jacket for circulation of cooling medium, to keep the egg material at a temperature not over about 50° F. This step of milling the egg white is desirable to keep the mucin material in suspension throughout the process so that it will continue through to the product and this valuable protein material will thus be saved and utilized. As the milled egg white leaves mill 4 it is continuously pumped to mixer 5 wherein the milled egg white is uniformly mixed with added carbohydrate and acid which are continuously metered into the mixer 5 at predetermined rates. If desired, solutions of whipping aids or other additives may also be metered in at 5. Mixer 5 may be provided with conventional cooling means such as a jacket for circulation of cooling medium, to keep the egg material at a temperature not over about 50° F.

The egg white containing added carbohydrate and acid is then pumped into a conventional spray drying system wherein it is converted into a dry powder. The drying system includes preheater 6 and spray drier 7. The preheater is optional and is helpful to increase the capacity of the drying system by initially raising the temperature of the egg white material. If used, the preheater should be of the type designed to provide high turbulent effects or other arrangements that provide a rapid heating effect without build-up or burn-on of thickened material on the hot surfaces. Typical of the types of apparatus which may be used are high-velocity tube or plate heat exchangers, swept-surface heat exchangers, steam injection heating systems, etc. The outlet from the preheater is directly connected to spray drier 7 so that the preheated egg material is immediately dried.

The arrangement explained above provides the particular advantage that the multiplication of adventitious microorganisms in the egg white is prevented. Contributing to this desirable effect are the factors of (1) rapid processing and (2) low temperature of the egg material. Regarding factor 1, it is to be noted that in the continuous process of the invention there is no holding or storage of the liquid egg material. Thus, once the egg white is drawn from reservoir 3 it passes successively through the various stages without any delay and emerges as a finished dry product a very short time later. Thus by providing continuous operations with no significant lag in the successive operations nor between successive operations, the total processing time from withdrawal of the raw egg white to emergence of the dry product occupies at most a few minutes, never more than 5 or 10 minutes. Under such circumstances there is provided no opportunity for microbial flora to multiply. Particularly important in this regard is the rapid processing of the egg material once it has been acidified. Thus the addition of acid in mixer 5 provides the egg white with a slightly acid to neutral pH and under such conditions Salmonellae would thrive, if given the opportunity. However, since the acidified egg is immediately fed into the spray drying system, drying takes place before these microorganisms can multiply. Regarding factor 2, mentioned above, the low temperature of the egg material during processing also mitigates against microbial growth. Thus the raw egg white is drawn from storage at a cool temperature and by processing it rapidly with no holding periods and by applying cooling if such is needed at the milling and mixing stages, the egg material is kept cool (that is, at a temperature not above 50° F.) until the moment when it is preheated or spray dried, if the preheating step is not employed. At this low temperature the growth of microorganisms in general is exceedingly slow and, more particularly, the growth of Salmonellae and other pathogens is prevented.

It is within the purview of the invention to carry out the process batchwise rather than continuously. Such procedure may be desirable, for example, in situations where equipment for metering of the sugar and acid is not available. In applying the invention on a batch system, the same system is used, that is, sugar and edible acid and other optional additives as whipping aids are added to egg white which contain its natural complement of sugars. The resulting composite of egg white, sugar, and acid is then dried. As in the continuous process, it is preferred to start with cool egg white and maintain its temperature at a level preferably not above 50° F. throughout the procedure until it enters the drying system. Such cooling of the egg white is particularly important after acidification in order to nullify the growth-enhancing effect of acidification on adventitious Salmonella organisms. Also in the continuous system, it is preferred that the various steps be applied without delay to minimize any possibility of microbial multiplication.

EXAMPLES

The invention is further demonstrated by the following illustrative examples:

A 180-lb. lot of fresh egg white was divided into three 60-lb. portions. Into one portion was incorporated 10% by weight of sucrose (6.66 lbs.) and 150 grams of 85% lactic acid (diluted with 3 parts of water). Into the second portion was incorporated 5% by weight of sucrose (3.16 lbs.) and 150 g. of 85% lactic acid (diluted with 3 parts of water). To provide a control, no sugar was added to the third portion but acid was added in the same proportion as with the first two portions. The pH of the three portions of egg white was 6.2. A commonly-used whipping aid (sodium lauryl sulphate, 1.9 g., contained in 200 ml. of water) was added to each portion of egg white.

All three portions of egg white were then spray dried at an inlet air temperature of 300° F. and an outlet air temperature of 150° F. Samples were taken for tests and the remainder of each lot was stored in glass jars at 104° F.

The three products are described in the following table:

| Sample | Amount of sucrose added | | Moisture content of product | | pH of product [1] |
|---|---|---|---|---|---|
| | Wet basis, percent | Moisture-free basis, percent | As is basis, percent | Sugar-free basis, percent | |
| 1 | 10 | 45.6 | 3.09 | 5.63 | 7.8 |
| 2 | 5 | 31.3 | 3.58 | 5.13 | 8.0 |
| 3 | 0 | 0 | 5.23 | 5.23 | 8.4 |

[1] On reconstitution.

After storing the three samples at 104° F. for 18 weeks, they were tested in various ways.

The degree of browning of the products was tested as follows: The reflectance of the products (at 500 m$\mu$) was measured and this figure subtracted from the reflectance of the product as initially prepared to provide the Loss of Reflectance at 500 m$\mu$. With this measurement a higher figure denotes a darker product. Aliquots of the samples (initially and after storage) were extracted with pH 4.8 buffer and the resultant extracts after filtration were tested for their property of absorbing light (at 380 m$\mu$). By subtracting the initial absorbance from the absorbance after storage, one obtains the Increase in Absorbance. With this measurement a higher figure denotes a darker extract.

The degree to which the egg proteins had been damaged was determined by ascertaining the solubility of the protein in the products before and after storage. The difference between these two provides the loss in protein solubility. It is obvious that the greater this figure, the greater is damage to the egg proteins. Also, the pH drop (on reconstitution) of the products was determined as a measure of Maillard reaction.

The performance characteristics of the products were tested by (a) determining the whip time—the time required for the reconstituted product to increase tenfold in volume when beaten—and (b) by employing the products in making standard angel-food cakes.

The results obtained are tabulated below:

Browning measurements

[Products stored 18 weeks at 104° F.]

| Sample | Sucrose added before drying, wet basis, percent | Color (Visual) | Loss in reflectance at 500 m$\mu$, percent | Increase in absorbance of extract 380 m$\mu$ |
|---|---|---|---|---|
| 1 | 10 | White | 4 | 2 |
| 2 | 5 | Slightly off-white | 9 | 4 |
| 3 | 0 | Brown | 36 | 65 |

Protein denaturation measurements

[Products stored 18 weeks at 104° F.]

| Sample | Sucrose added before drying, wet basis, percent | Protein solubility loss, percent | Drop in pH |
|---|---|---|---|
| 1 | 10 | 1 | 0.8 |
| 2 | 5 | 2 | 1.1 |
| 3 | 0 | 6 | 2.5 |

Foaming and angel-food cake performance

[Products stored 18 weeks at 104° F.]

| Sample | Sucrose added before drying, wet basis, percent | Whip time, sec. | Cake volume, ml. | Crum color |
|---|---|---|---|---|
| 1 | 10 | 44 | 650 | Slightly off-white. |
| 2 | 5 | 45 | 650 | Slightly tan. |
| 3 | 0 | 65 | 590 | Brown. |

Having thus described the invention, what is claimed is:

1. A process for preparing dried egg white products which comprises providing liquid egg white containing its natural complement of sugars, adding thereto a water-soluble carbohydrate in an amount from about 5 to about 20% by weight, and an edible acid in an amount to provide a pH from about 6 to about 8 in the reconstituted product, and immediately drying said egg white containing its natural complement of sugars plus added carbohydrate plus added acid.

2. The process of claim 1 wherein the carbohydrate is sucrose.

3. The process of claim 1 wherein the carbohydrate is sucrose which is added in an amount of about 10% by weight.

4. A continuous process for preparing dried egg white products which comprises providing a continuous stream of liquid egg white containing its natural complement of sugars, continuously milling the egg white, continuously metering into the stream of milled egg white a water-soluble carbohydrate in an amount from about 5 to 20% by weight, and an edible acid in an amount to provide a pH from about 6 to 8 in the reconstituted product, continuously mixing said added carbohydrate and acid into said egg white stream, and immediately and continuously spray drying said stream of egg white containing its natural complement of sugars plus added carbohydrate plus added acid.

5. The process of claim 4 wherein the total time for processing from initiation of the milling to production of the dry product is less than 10 minutes.

6. The process of claim 4 wherein the egg material is initially supplied at a temperature of about 40 to 50° F. and wherein its temperature is maintained at substantially said level until it is subjected to spray drying.

7. The process of claim 4 wherein the total time for processing from initiation of the milling to production of the dry product is less than 10 minutes and wherein the egg material is initially supplied at a temperature of about 40 to 50° F. and wherein its temperature is maintained at substantially said level until it is subjected to spray drying.

References Cited by the Examiner

UNITED STATES PATENTS

| 1,203,983 | 11/16 | Contant | 99—210 |
| 1,737,365 | 11/29 | Epstein | 99—196 |
| 1,996,801 | 4/35 | Fischer | 99—210 |
| 3,082,098 | 3/63 | Bergquist | 99—210 |

FOREIGN PATENTS 2939,794  10/29  Great Britain.

A. LOUIS MONACELL, *Primary Examiner.*